United States Patent [19]
Hattori et al.

[11] Patent Number: 4,734,447
[45] Date of Patent: Mar. 29, 1988

[54] HOT-MELT ADHESIVE

[75] Inventors: Yoshiya Hattori, Kyoto; Toshimori Sakakibara, Shiga, both of Japan

[73] Assignee: Sunstar Giken Kabushiki Kaisha, Takatsuki, Japan

[21] Appl. No.: 902,654

[22] Filed: Sep. 2, 1986

[30] Foreign Application Priority Data

Sep. 24, 1985 [JP] Japan ................................. 60-211665
Sep. 24, 1985 [JP] Japan ................................. 60-211666
Oct. 18, 1985 [JP] Japan ................................. 60-234141

[51] Int. Cl.$^4$ ....................... C08L 23/26; C08L 53/02
[52] U.S. Cl. .................................... 524/271; 524/505; 525/98; 525/194; 525/333.8
[58] Field of Search ................... 524/271, 505; 525/98, 525/194, 333.8

[56] References Cited

U.S. PATENT DOCUMENTS 3,850,858 11/1974 Park ....................................... 525/98
3,993,613 11/1976 Doss et al. ............................ 525/98
4,112,208 9/1978 McConnell et al. ............. 525/333.8

Primary Examiner—Wilbert J. Briggs, Sr.
Attorney, Agent, or Firm—Wegner & Bretschneider

[57] ABSTRACT

An improved hot-melt adhesive which comprises a styrene block copolymer resin, a tackifier and a modified polybutene which is solid at room temperature, said hot-melt adhesive having excellent durable adhesion strength, cold resistance and heat resistance with improved open time, and a tackifier composition suitable for the preparation of the hot-melt adhesive.

4 Claims, No Drawings

4,734,447

HOT-MELT ADHESIVE

This invention relates to an improved hot-melt adhesive and a tackifier composition suitable therefor. More particularly, it relates to a hot-melt adhesive composition comprising a styrene block copolymer resin, a tackifier and a modified polybutene which is solid at room temperature, which composition has a long adhesion time (long open time), that is, when the composition is molten and applied to, it can show adhesion properites for a long time, and further has excellent adhesion and extensibility, and an improved tackifier composition suitable for the preparation of the hot-melt adhesive.

TECHNICAL BACKGROUND

Styrene block copolymer resins have excellent thermoplastic rubber properties, particularly easy compatibility of unvulcanized rubber and also excellent stress-strain characteristics of vulcanized rubber, and in view of these excellent physical and chemical properties, they have widely been used in various fields, and the expansion of utilities is still expected.

SUMMARY DESCRIPTION OF THE INVENTION

The present inventors have studied as to new application of the styrene block copolymer resins, and have found that when the styrene block copolymer resins are heat-treated and kneaded in the presence of a tackifier and a modified polybutene which is solid at room temperature, the kneaded product shows excellent tackiness and extensibility with long open time and is suitable as a hot-melt adhesive.

An object of the invention is to provide an improved hot-melt adhesive. Another object of the invention is to provide a hot-melt adhesive having a long open time. A further object of the invention is to provide a tackifier suitable for the hot-melt adhesive. These and other objects and advantages of the invention will be apparent to skilled persons from the following description.

DETAILED DESCRIPTION OF THE INVENTION

The hot-melt adhesive of this invention comprises a styrene block copolymer resin, a tackifier and a modified polybutene which is solid at room temperature.

The styrene block copolymer resin used in this inveniton includes, for example, styrene-butadiene block copolymer resin (hereinafter, referred to as "SB resin"), styrene-butadiene-styrene block copolymer resin (hereinafter, referred to as "SBS resin"), styrene-isoprene-styrene block copolymer resin (hereinafter, referred to as "SIS resin"), and the like, and some of them are commercially available in the names of "Califrex TR-1101", "Califrex TR-1102" and "Califrex TR-1107" (manufactured by Shell Chemical, K.K.). Among these, SIS resin is particularly suitable.

The tackifier used in this invention includes any conventional products, for example, coumarone resins, coumarone-indene resins, styrene resins, synthetic hydrocarbon resins, rosin resins, polyterpene resins, hydrogenated terpene resins, and the like, among which the hydrogenated terpene resin are preferable. These may be used alone or in combination or two or more thereof. The tackifier is usually used in an amount of 5 to 100 parts by weight, preferably 50 to 100 parts by weight, to 100 parts by weight of the styrene block copolymer resin.

The modified polybutene used in this invention is solid at room temperature and is prepared by heating a conventional polybutene which is solid at room temperature in the presence of an organic peroxide [e.g. benzoyl peroxide, methyl ethyl ketone peroxide, dicumyl peroxide, cumene hydroperoxide, dibutyl peroxide, t-butyl peroxybenzoate, 1,3-bis-(t-butyl peroxyisopropyl)benzene, etc.] at a temperature of 150° to 250° C., whereby the molecule of the polybutene is cleaved. The starting polybutene has usually a molecular weight of $1 \times 10^6$ to $3 \times 10^6$. The polybutene being solid at room temperature has higher durable adhesion strength than that of polybutene being liquid at room temperature, and when the polybutene being solid at room temperature is modified as mentioned above, the product shows no lowering of the adhesion strength at a lower temperature and a higher temperature (e.g. higher than 80° C.) and has excellent cold resistance and heat resistance, and further can give a longer open time to the adhesive composition. The modified polybutene is usually used in an amount of 5 to 40 parts by weight, preferably 8 to 20 parts by weight, to 100 parts by weight of the styrene block copolymer resin. When the amount of the modified polybutene is less than 5 parts by weight, the hot-melt adhesive can not show the desired long open time, and on the other hand, when the amount is over 40 parts by weight, the hot-melt adhesive shows to high melt viscosity and is hardly applicable.

The hot-melt adhesive of this invention can be prepared by mixing the styrene block copolymer resin, tackifier and modified polybutene being solid at room temperature in the suitable amounts as mentioned above, and optionally with an appropriate amount of conventional additives such as fillers, plasticizers, melt viscosity modifiers and the like and belting and kneading the mixture.

In the above preparation, when the styrene block copolymer resin and the tackifier are previously mixed and kneaded before mixing with the solid modified polybutene, it can preferably give more improved open time to the final hot-melt adhesive composition. That is, the styrene block copolymer resin and the tackifier are previously mixed in the above-mentioned amounts, and the mixture is heated and kneaded in air at a temperature of 150° to 220° C., preferably 170° to 200° C., for 30 to 150 minutes, preferably 45 to 100 minutes. By this treatment, the styrene block copolymer is air-oxidized and thereby decomposed in an appropriate degree, and the decomposed product acts synergistically together with the tackifier to enhance the tacking properties of the final product with a long open time. When the heating and kneading temperature is lower than 150° C., the desired oxidation is extremely slower, and hence, there can not be achieved the desired tackiness, and on the other hand, when the temperature is over 220° C., the oxidization proceeds in too excess, and thereby, the product shows remarkably decreased coagulation and is disadvantageously colored. The composition thus kneaded is used as a tackifier composition for mixing and heat-treating with the modified solid polybutene as mentioned above, and thereby, there can be obtained the desired composition having more improved properties.

The composition thus obtained has excellent durable adhesion strength, cold resistance and heat resistance, and further appropriate open time and is useful as a hot-melt adhesive.

The present invention is illustrated by the following examples but should not be construed to be limited thereto.

EXAMPLE 1

(i) Preparation of Modified Polybutene

To polybutene which is solid at room temperature and has a molecular weight of about $2 \times 10^6$ (10 kg) is added 1,3-bis(t-butyl peroxyisopropyl)benzene (Percadox-14, manufactured by Kayaku Nouley, 5 g) and the latter is well dispersed. The mixture is heat-treated at 200° C. with an excluder to give a modified polybutene which is solid at room temperature.

(ii) Preparation of a hot-melt adhesive

To a SIS resin (Califrex TR-1107, manufactured by Shell Chemical K.K., 100 parts by weight) are added an alicyclic hydrocarbon resin (Arkon P-115, manufactured by Arakawa Kagaku Kogyo K.K., 80 parts by weight) and the modified polybutene obtained above (12 parts by weight), and the mixture is molten and kneaded at 180° C. with a kneader to give a homogeneous hot-melt adhesive.

REFERENCE EXAMPLE 1

In the same manner as described in Example 1 except that a non-modified polybutene which is solid at room temperature (Polybutene M-8640, manufactured by Mitsui Peterochemical Industries, Ltd., 5 parts by weight) is used instead of the modified polybutene, wherein the viscosity of the polybutene is regulated to a similar one to the modified polybutene, there is produced a hot-melt adhesive.

The hot-melt adhesives as prepared in Example 1 and Reference Example 1 were molten at 180° C. and applied to a plate in a bead-like shape [5 cm (length)×2 cm (width)×0.5 cm (thickness)], and the open time was evaluated by touching with a finger after allowing to stand for a prescribed time. The results are shown in Table 1.

TABLE 1

| Ex. No. | Time for allowing to stand (second) | | | | |
|---|---|---|---|---|---|
| | 10 | 20 | 30 | 40 | 50 |
| Ex. 1 | o | o | o | o | x (skinning) |
| Ref. Ex. 1 | o | x (skinning) | — | — | — |

EXAMPLE 2

(i) Preparation of Tackifier Composition

A mixture of a SIS resin (Califrex TR-1107, manufactured by Shell Chemical K.K., 100 parts by weight) and a hydrogenated terpene resin (Clearon M-115, manufactured by Yasuhara Yushi K.K., softening point: 115° C., 100 parts by weight) is heated and kneaded at 190° C. in air for 30 minutes with a kneader to give a homogeneous tackifier composition.

(ii) Preparation of Modified Polybutene

To polybutene which is solid at room temperature (MI=1.0) (10 kg) is added 1,3-bid(t-butyl peroxyisopropyl)benzene (Percadox-14, manufactured by Kayaku Nouley, 5 g) and the latter is well dispersed. The mixture is heat-treated at 200° C. with an excluder to give a modified polybutene which is solid at room temperature (MI=100±10).

(iii) Preparation of a Hot-melt Adhesive

To the tackifier obtained above, 300 parts by weight) are added the modified polybutene obtained above (60 parts by weight) and an atactic polypropylene (APP) (Yukatack B-3, manufactured by Mitsubishi Yuka K.K., 60 parts by weight) and the mixture is molten and homogeneously kneaded under $N_2$ atmosphere for 30 minutes to give a hot-melt adhesive.

REFERENCE EXAMPLE 2

A mixture of a SIS resin (Califrex TR-1107, manufactured by Shell Chemical K.K., 100 parts by weight), a hydrogenated terpene resin (Clearon M-115, manufactured by Yasuhara Yushi K.K., softening point: 115° C., 200 parts by weight), polybutene being solid at room temperature (MI=1.0, 15 parts by weight) and APP (Yukatack B-3, manufactured by Mitsubishi Yuka K.K., 85 parts by weight) is heated and kneaded at 190° C. for 30 minutes under $N_2$ atmosphere with a kneader to give an adhesive.

(Evaluation)

1. Setting time (open time):

The adhesives as prepared in Example 2 and Reference Example 2 were molten at 180° C. and applied to a plate in a bead-like shape [5 cm (length)×2 cm (width)×0.5 cm (thickness)], and the open time (until the skinning) was measured by touching with a finger. The results are shown in Table 2.

TABLE 2

| Ex. No. | Time for allowing to stand (second) | | | | | |
|---|---|---|---|---|---|---|
| | 10 | 20 | 30 | 40 | 50 | 60 |
| Ex. 1 | o | o | o | o | o | x (skinning) |
| Ref. Ex. 1 | o | o–Δ | x (skinning) | — | — | — |

2. Adhesion and extensibility:

The adhesive was molten at 190° C. and poured into a channel (5 mm×5 mm) between polypropylene (PP) plates, and thereto was inserted a polypropylene plate [2 cm (width)×7 cm (length)×2 mm (thickness)], and the pulling strength was measured at a pulling rate of 10 mm/min. with an autograph (manufactured by Shimadzu Corp.). The results are shown in Table 3.

TABLE 3

| Ex. No. | Adhesion | Extensibility |
|---|---|---|
| Ex. 2 | CF | 25 mm |
| Ref. Ex. 2 | PP—AF | PP—AF with 5 mm movement |

[Note]:
CF: cohesive failure,
AF: adhesive failure

PREPARATION 1

In the same manner as described in Example 2-(i), there is prepared a tackifier composition.

PREPARATION 2

In the same manner as in Example 2-(i) except that the kneading time is changed to 45 minutes, 75 minutes, 90 minutes or 120 minutes, there are prepared tackifier compositions.

REFERENCE PREPARATION 1

In the same manner as in Preparations 1 and 2 except that the treatment is carried out under nitrogen gas atomosphere instead of under air atmosphere, there are prepared tackifier compositions.

PREPARATION 3

In the same manner as in Example 2-(i) except that the kneading temperature is changed to 170° C. or 220° C., there are prepared tackifier compositions.

REFERENCE PREPARATION 2

In the same manner as in Preparations 1 and 3 except that the treatment is carried out under nitrogen gas atomosphere instead of under air atmosphere, there are prepared tackifier compositions.

TEST OF TACKING PROPERTIES

As to the compositions as prepared in Preparations 1 to 3 and Reference Preparations 1 to 2, the ball tack thereof was tested by the method as disclosed in ASTM D-3121-73. The results are shown in Tables 4 and 5.

TABLE 4

(at fixed kneading temperature: 190° C., varying the kneading time)

| Ex. No. | Kneading time (minute) | | | | |
|---|---|---|---|---|---|
| | 30 | 45 | 75 | 90 | 120 |
| Exs. 1 & 2 | 13 cm | 9 cm | 8 cm | 7 cm | 7 cm |
| Ref. Ex. 1 | 20< | 20< | 20< | 20< | 20< |

TABLE 5

(at fixed kneading time: 30 minutes, varying the kneading temperature)

| Ex. No. | Kneading temperature (°C.) | | |
|---|---|---|---|
| | 170 | 190 | 220 |
| Exs. 1 & 2 | 18 cm | 13 cm | 6 cm |
| Ref. Ex. 2 | 20< | 20< | 20< |

REFERENCE PREPARATION 3

The same SIS resin and hydrogenated terpene resin as used in Example 2-(i) are kneaded in a usual manner.

As to the composition thus prepared, the ball tack was measured likewise. As a result, it showed a rolling distance of ball of more than 20 cm, which means that it had less tacking properties.

What is claimed is:

1. A hot-melt adhesive composition which comprises a styrene block copolymer resin selected from the group consisting of block copolymer resins of styrene and butadiene and block copolymer resins of styrene and isoprene, a tackifier and a modified polybutene which is solid at room temperature and is prepared by heat-treating a polybutene in the presence of an organic peroxide, said styrene block copolymer resin and said tackifier being kneaded together in air at a temperature of about 150° to 220° C. prior to mixing with said modified polybutene.

2. The composition according to claim 1, wherein the ratios of the ingredients are 100 parts by weight of the styrene block copolymer resin, 5 to 100 parts by weight of the tackifier, and 5 to 40 parts by weight of the modified polybutene.

3. The composition according to claim 1, wherein the styrene block copolymer resin is a member selected from the group consisting of styrene-butadiene block copolymer resins, styrene-butadiene-styrene block copolymer resins and styrene-isoprene-styrene block copolymer resins.

4. The composition according to claim 1, wherein the polybutene has a molecular weight of about 1,000,000 to 3,000,000.

* * * * *